US005854670A

United States Patent [19]
Yong

[11] Patent Number: 5,854,670
[45] Date of Patent: Dec. 29, 1998

[54] IMAGE FORMING DEVICE FOR BOTH UNBOUND AND BOUND ORIGINALS

[76] Inventor: Gao Yong, 981 Gulf Pl, Apt. 909, Ottawa, Ontario, Canada, K1K 3X9

[21] Appl. No.: 392,986
[22] PCT Filed: Sep. 30, 1992
[86] PCT No.: PCT/CA92/00414
§ 371 Date: Mar. 7, 1995
§ 102(e) Date: Mar. 7, 1995
[87] PCT Pub. No.: WO94/06061
PCT Pub. Date: Mar. 17, 1994

[30] Foreign Application Priority Data

Sep. 10, 1992 [CA] Canada .............................. 2,077,956-0

[51] Int. Cl.[6] ............................ G03B 27/32; G03B 27/52
[52] U.S. Cl. ................................................ 355/25; 355/23
[58] Field of Search ................................ 355/25, 75, 23; 399/144; G03G 15/00

[56] References Cited

U.S. PATENT DOCUMENTS

| | | | |
|---|---|---|---|
| 4,585,334 | 4/1986 | Malyon | 355/25 |
| 4,645,332 | 2/1987 | Malyon | 355/25 |
| 4,704,814 | 11/1987 | Folkins | 355/7 |
| 4,912,507 | 3/1990 | Kinoshita | 355/203 |
| 5,689,348 | 11/1997 | Takahashi et al. | 355/25 X |

FOREIGN PATENT DOCUMENTS

| | | | |
|---|---|---|---|
| 60-122932 | 8/1983 | Japan | G03B 27/62 |

*Primary Examiner*—R. L. Moses
*Assistant Examiner*—Shival Virmani

[57] ABSTRACT

An image forming device having multiple direction lens system, a presetting system, a page turner, a movable platform to manipulate both unbound and bound originals, an image monitoring unit, a microcomputer-based control system and an image formation unit, is disclosed that provides the capability of automatic and manual image formation from both unbound and bound originals. The automatic image formation from bound originals is enabled in both Flat Open Mode (original 180° face-up opened) and Angled Open Mode (originals less than 180° face-up opened). Unbound documents can also be face-up loaded on the movable platform for the automatic image formation and will never be jammed. While having bound or unbound originals face-up positioned on the 3D-movable frame, the manual image formation in both single and dual projecting direction also becomes much easier and effective with higher copy quality. The page turner is capable of operating with lifting power to turn pages of bound or unbound originals in the automatic and continuous image forming process. The presetting system is able to set up an image field in a desired size for the image formation, eliminate dark edge shadows and tailor off unwanted portion of originals. The image monitoring means is provided to monitor the set-up of originals that enables visible adjustment of orientation, field and size of the originals before starting the image recording process.

22 Claims, 14 Drawing Sheets

Fig.5
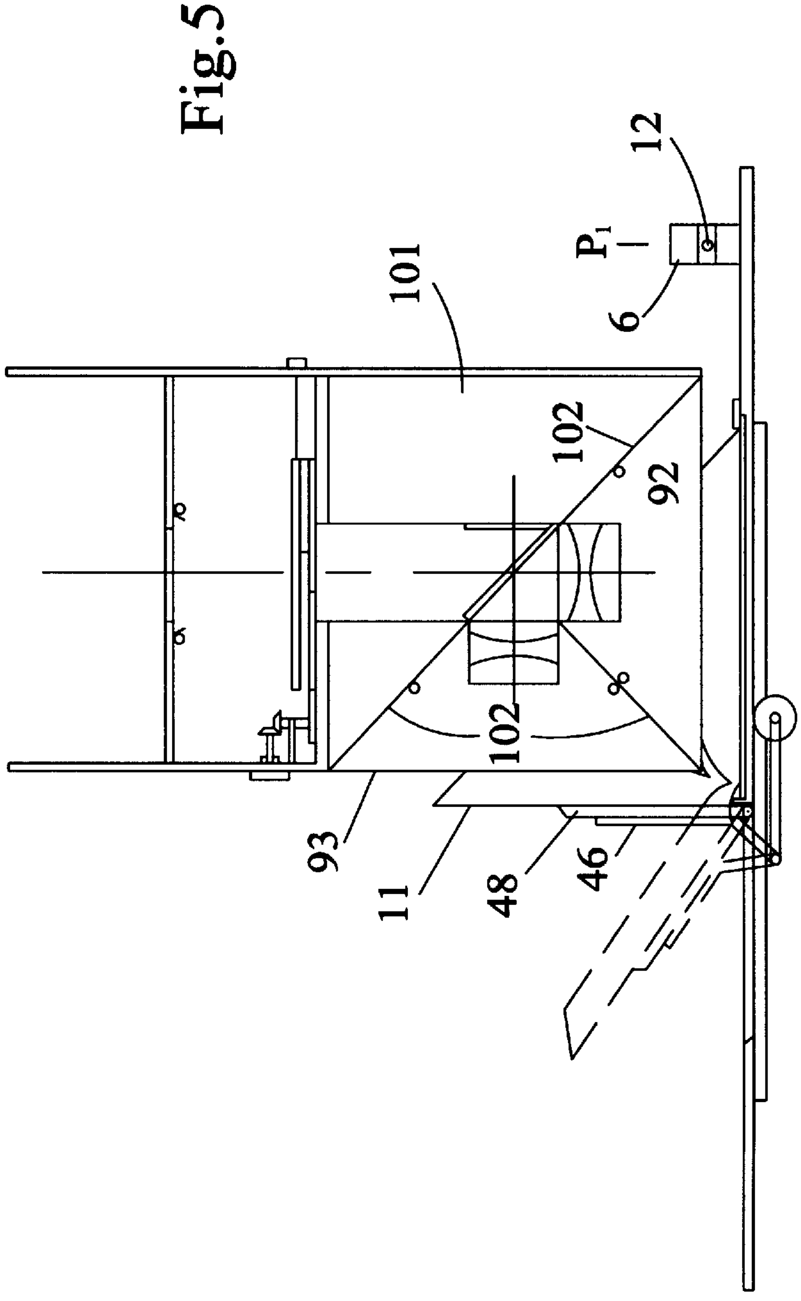
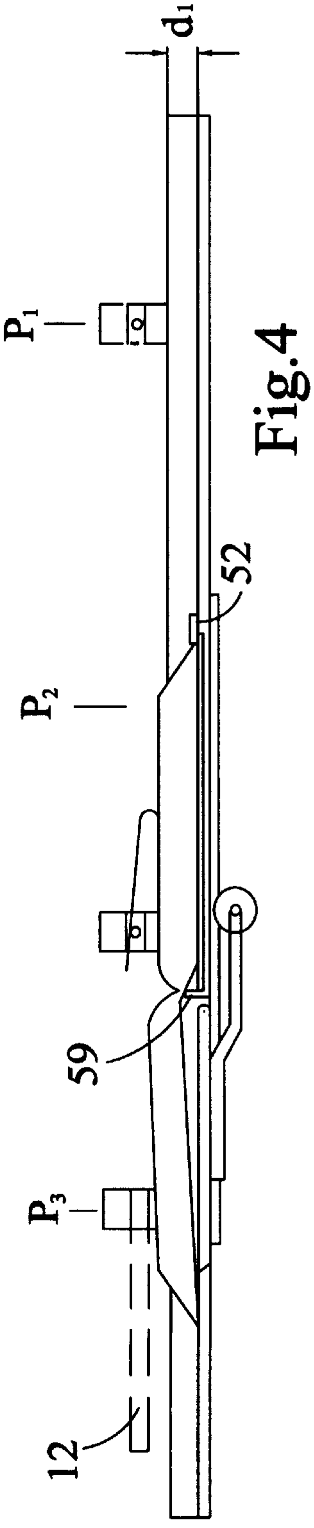
Fig.4

Fig.13
B - B
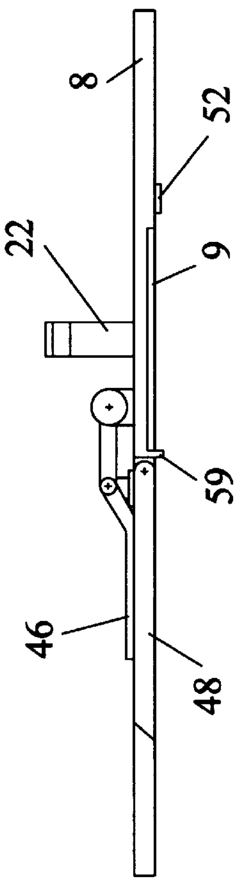
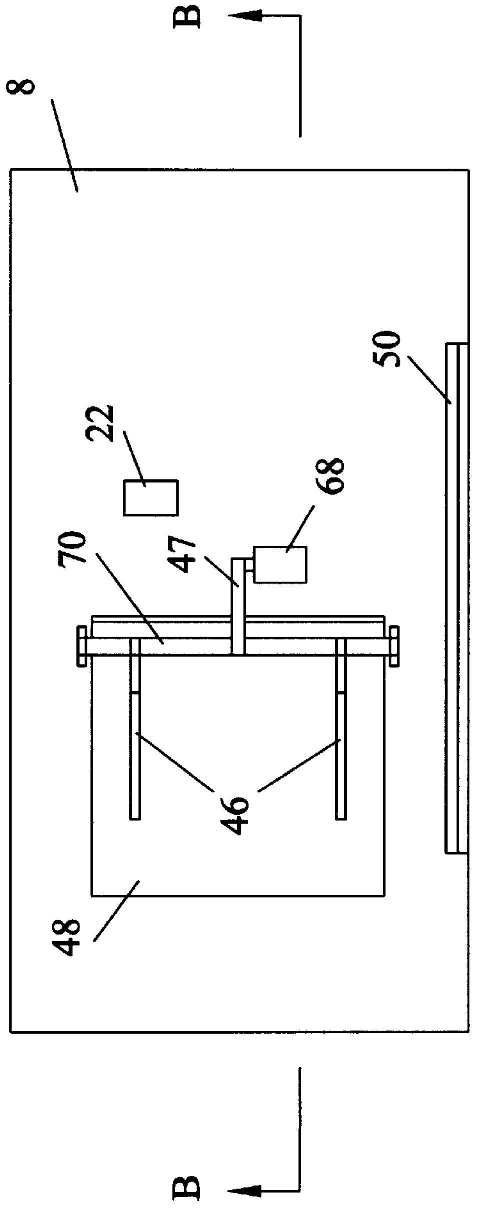
Fig.12

IMAGE FORMING DEVICE FOR BOTH UNBOUND AND BOUND ORIGINALS

SUMMARY OF THE INVENTION

An object of the present invention is to provide an image forming device which is able to manually and automatically ("manually" means that turning pages of the originals and reloading them at a certain angle in a registered position are accomplished by user's hands, and "automatically" means that the above work is fully conducted by the said device, thereinafter) carry out image formation from both unbound and bound originals - documents and books).

Another Object of the present invention is to provide an image forming device which has capability and flexibility of handling various binding types of the bound originals which may be made in all kinds of irregular sizes, and once opened at 180° angle, either freely staying fiat or having heavy distortion of opened pages or even turned to be folded back due to binding tension once holding force withdrawn, for both automatic and manual image formation.

Another object of the present invention is to provide an image forming device which can also easily conduct both automatic and manual image formation from the unbound originals with little volume limits for each single loading of the originals and will never jam the originals.

Another object of the present invention is to provide an image forming device which has a means capable of monitoring the set-up of the originals in different sizes so that the image orientation. Field and size of the originals can be visibly adjusted before starting an image recording process.

Another object of the present invention is to provide an image forming device which has a means able to preset an image field in desired size for the image formation, to eliminate the dark edge effect caused by different intensity of reflected image light from images of both originals and the edges around the originals within a fixed image aperture and to prevent dark edge shadows from forming on recording media with transferred images, and a wasteful consumption of toner and a pollution of the transfer charger can also be avoided.

A feature of the present invention is that the image forming device has both unbound and bound originals all face-up loaded at certain angles on a table-like frame of the said device, instead of conventionally face-down loaded on a platen.

Another feature of the present invention is that the said image forming device comprises an image forming housing with a side platen and a bottom platen facing down, a flexible dual direction lens system, a set of beam splitting mirrors and a set of reflecting mirrors for guiding the reflected image light from the said originals, and two groups of illuminating lamps. For the unbound originals and the bound originals face-up opened at 180° angle, only a face-down vertical lens unit is used to carry out the image formation. Once the bound originals are positioned at a certain angle of less than 180°, two lens units can be used in turn to carry out the dual direction image formation. (As different embodiments of the present invention, the dual direction lens system can be constructed with two lens units at different angles or one rotatable lens unit with angled positions ranged widely, and for convenience of presenting this invention. the two lens units orientated at 90° angle is recited. On the other hand. each one of the two lens units can be formed with a group of either positive or negative lenses or with a combination of the both. In this presentation of the present invention, two negative lens units are recited, thereinafter).

Another feature of the present invention is that the said image forming device has capability of freely forming enlarged or reduced images from both bound and unbound originals with stepless magnification or reduction by using the focus-adjustable vertical lens unit and/or positioning the originals at different distances from the bottom platen of the said device.

Another feature of the present invention is that the said image forming device comprises a movable loading table-like frame to vertically handle the originals, a movable graduated platform on the frame to accomplish transversal manipulation, a rotatable supporting plate installed on the platform to hold the bound originals opened at 90° angle for the dual direction image formation, and a flat sliding plate located in the central zone on the platform to provide more flexibility of handling both bound and unbound originals for both automatic and manual image formation.

Another feature of the present invention is that the said image forming device is equipped with a page turner with lifting force capable of automatically turning pages of the unbound or bound originals in a continual manipulating process of the image formation. The page turner comprises a page turning rod providing the lifting force, and a movable body carrying the rod and having multi-direction mobilities. The page turner is manipulated by the controller according to different programmed operating modes, each of which has different motion combinations of the turner and the frame.

Another feature of the present invention is that the said image forming device is equipped with a microcomputer and a CNC controller unit in which automatic image formation is programmed in three main different operating modes which are Unbound mode for the image formation from the unbound originals, Flat Open Bound mode for the image formation from the 180° opened bound originals and Angled Open Bound mode for the image formation from the bound originals opened at 90° angle.

Another feature of the present invention is that the said image forming device has an image monitoring unit to project images of the originals onto a viewing screen for the purpose of monitoring the set-up of the originals in different size and adjusting the image orientation. Field and size before starting the image recording process.

Another feature of the present invention is that the said image forming device has a presetting system capable of setting up an image field in selected size for the image formation, covering dark images of the edges and simultaneously providing compensating tights during the process of the image formation, so that dark edge shadows can be prevented from forming on the recording media with transferred images.

BRIEF DESCRIPTION OF THE DRAWINGS

FIG. 4 is a front view of the platform and the page turner rolling up a page recorded.

FIG. 5 is similar to FIG. 3 but to show that the bound originals is loaded on the platform and the rotatable plate is holding the originals at 90° angle close-up to the two platens.

FIG. 12 is an upside down vertical view of the platform of the frame.

FIG. 13 is a B—B sectional view of FIG. 12.

DESCRIPTION OF THE PREFERRED EMBODIMENTS

The preferred embodiment of the present invention is to be described in detail with reference to the accompanying drawings.

Figure 1:
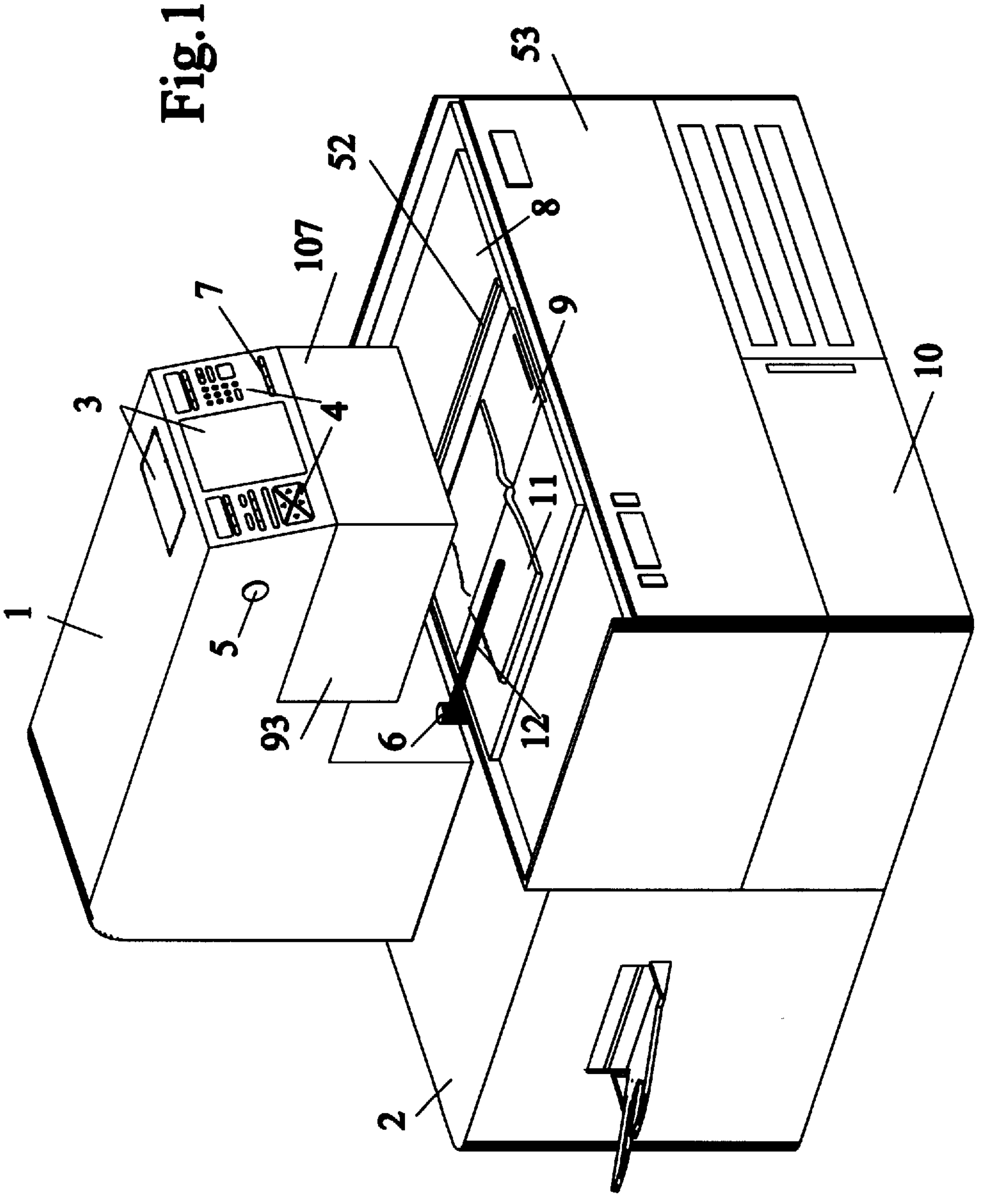
FIG. 1 is an external perspective view of an embodiment of an image forming device of the present invention.

FIG. 1 is an external view of the image forming device to which the present invention may be applied.

Figure 2:
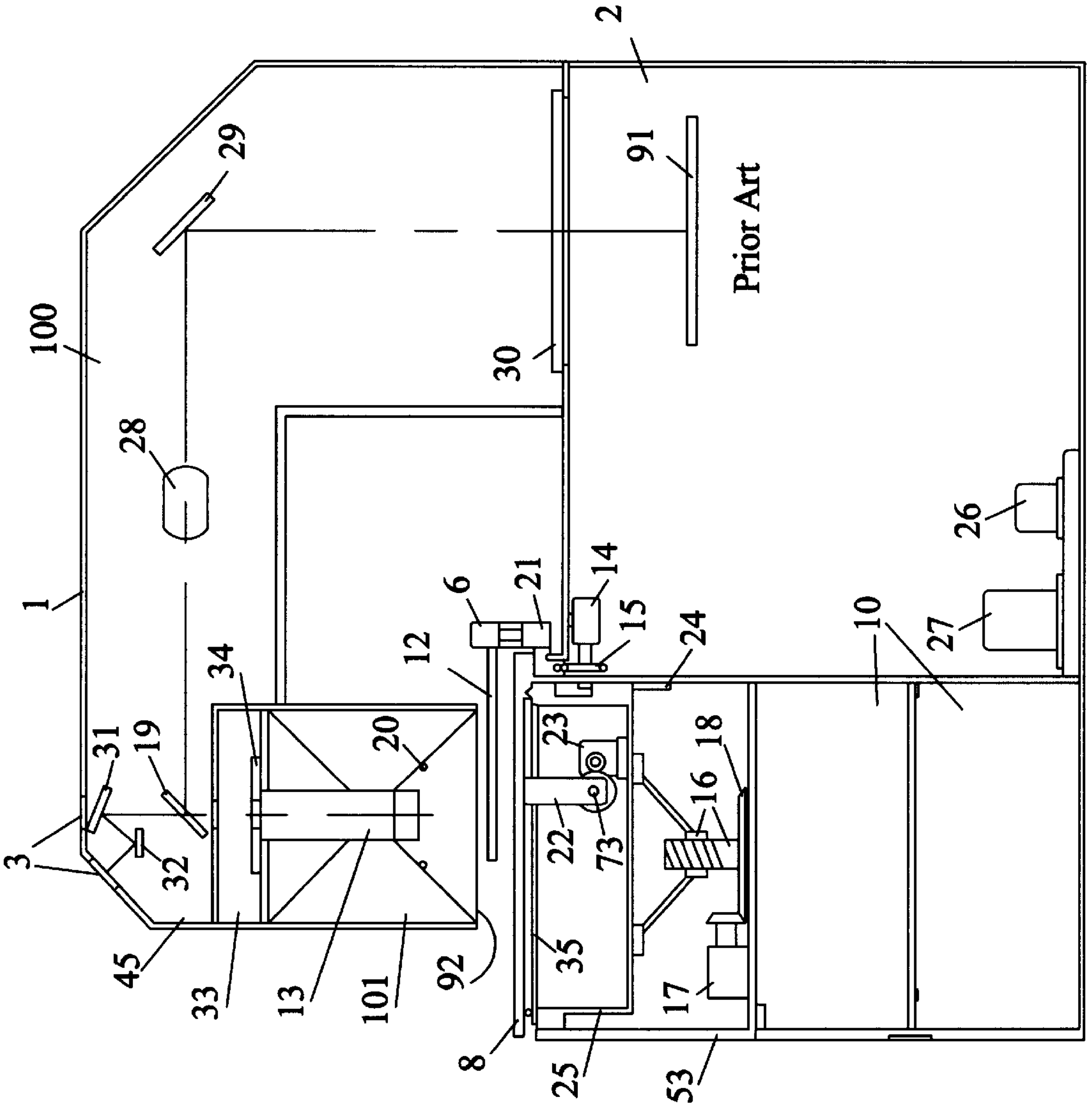
FIG. 2 is a sectional view of the whole body of the said device.

FIG. 1 and FIG. 2 in a sectional view, illustrate that the said image forming device comprises four major modules which are the "z,900 " shape assembling module I formed the top portion of the said device, having the image forming housing 101 with the platen 92 face-down and the platen 93 at the side in which the dual direction lens system 13 is installed, the presetting system 33, the image monitoring unit 45 and the light guiding unit 100; the image recording unit 2 which can be constructed with a prior art 91 of either a photoreceptor belt image formation system or a photosensitive drum scanning image formation system with the solenoid shutter 30; the loading module 53 having the movable graduated table plate-like platform 8 and the movable table-like frame 25; and the pace turner 6 and also a storage compartment 10 is included.

Figure 3:
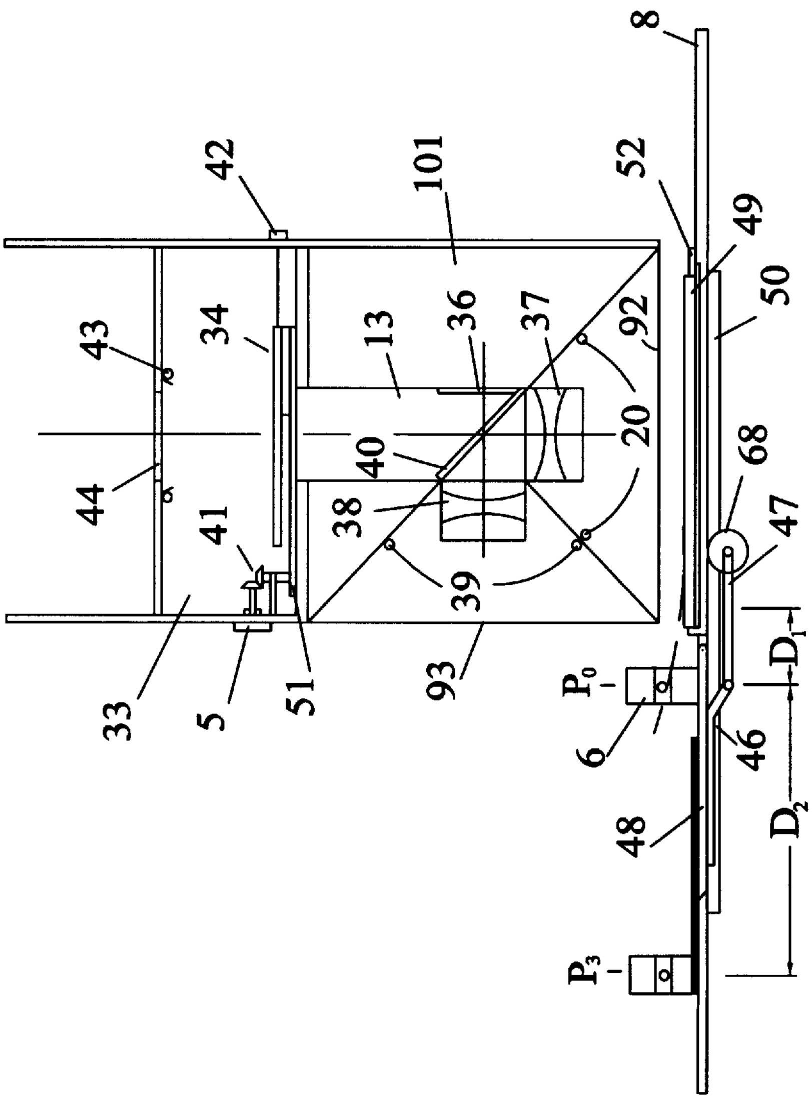
FIG. 3 is a front sectional diagram of the dual direction lens system, the movable frame carrying the unbound originals and the page turner lifting up a recorded page of the originals.
Figure 3A:
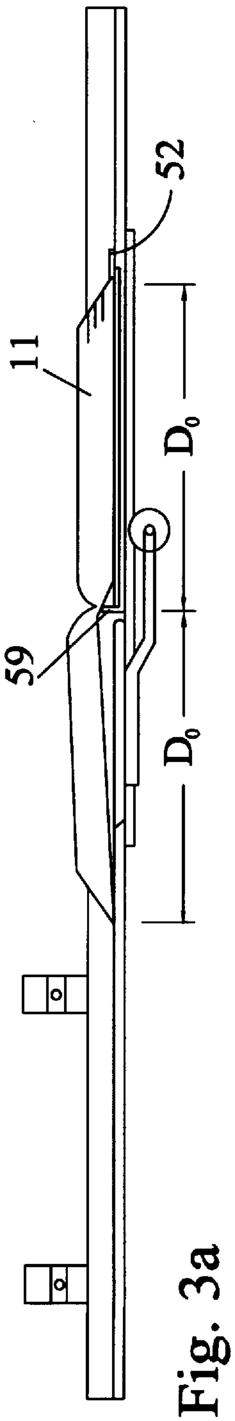
FIG. 3*a* is a front view of the frame carrying a flat opened book which left side is facing the bottom platen or the image forming housing.

The dual direction lens system 13, as shown in FIG. 2, FIG. 3 and FIG. 5, comprises the lens unit 37 having adjustable focusing for selecting image size of the originals, and the lens unit 38 corresponding to the platen 93. both of which can be constructed with combinations of negative lenses to form virtual erect images which can be projected to accomplish the image formation, the transparent half-silvered mirror 40 at 45° angle from the optical axis of the lens unit 38, and the reflecting mirror 36 vertically installed behind the mirror 40 toward the lens unit 38. The image light from the lens unit 37 can pass through the mirror 40 directly toward the rotatable mirror 19 in the image monitoring unit 45, but the image light from the lens unit 38, after passing through the mirror 40 and before reaching at the mirror 19, is reflected on the mirror 36 and the upper surface of the mirror 40 consecutively, in order to convert the image form to be consistent with that from the lens unit 37. The lens 28 is used to project the virtual image light from the mirror 19 for the image formation according to selected recording media in different sizes. The image forming housing 101 is divided into two working cells with the partitions 102 and there are installed the illuminating lamps 20 in the bottom cell for the lens unit 37 and the lamps 39 in the side cell for the lens unit 38, separately, as shown in FIG. 3 and FIG. 5. The lens unit 37 can be used to perform the image formation from either the face-up unbound originals 49, as shown in FIG. 3, or the fiat face-up opened bound originals 11 positioned under the platen 92, as shown in FIG. 3*a*. And with the lens unit 37 and lens unit 38 together the dual direction image formation from both sides of the bound originals positioned at right angle can be accomplished, as shown in FIG. 5. On the other hand, the illuminating lights in the said device always flash downwards or leftwards without any irritation to user's eyes.

Figure 17:
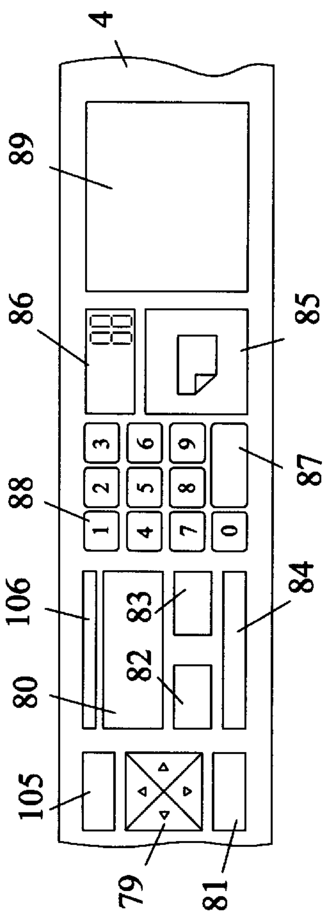
FIG. 17 is a schematic plan view of an operation control panel employed in the said device.

By using the focusing adjustable lens unit 37 which can be adjusted automatically by using the key 106 in FIG. 17 to instruct a stepping motor driving the lens unit (not shown, similar as used in any automated camera) or manually by hand as the housing door 107 in FIG. 1 opened, and by manipulating the table-like frame to position the originals at different distances from the bottom platen 92, images of the originals can be enlarged or reduced with stepless magnification or reduction.

Figure 11:
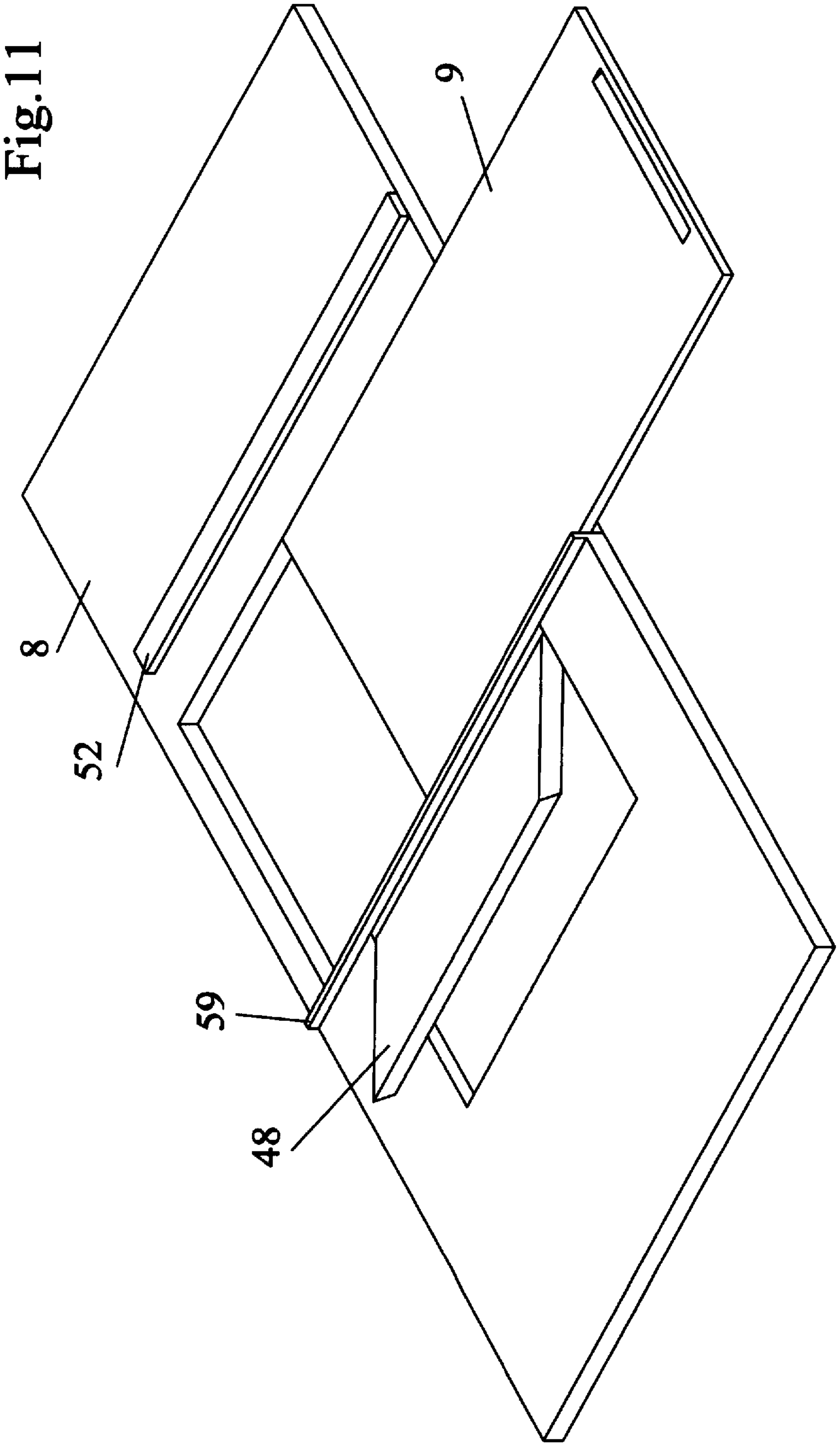
FIG. 11 is a perspective view of the platform of the frame.
Figure 14:
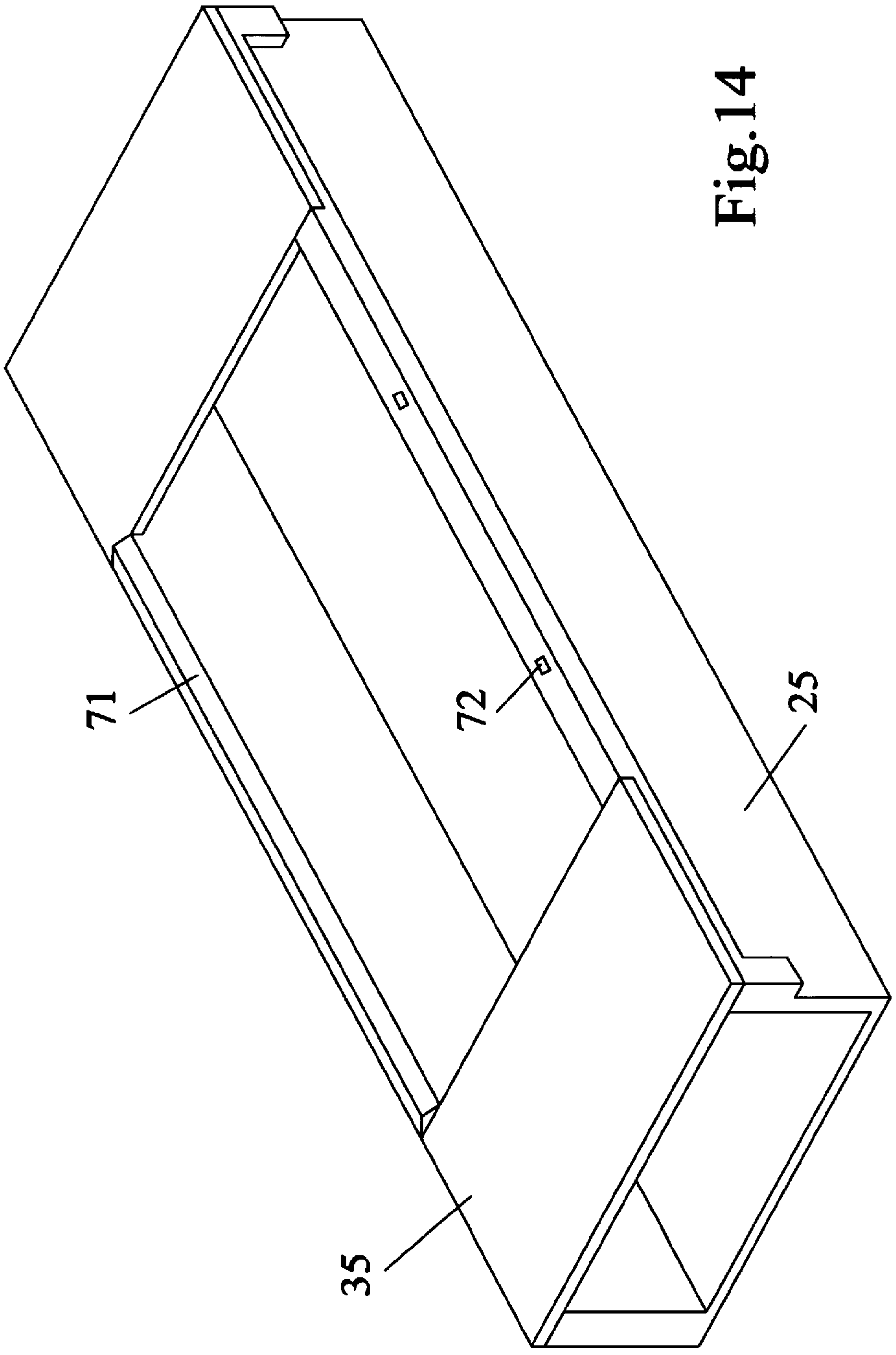
FIG. 14 is a perspective view of the frame of the loading module with an upside down "V" shape sliding rail on one side of the frame and two supporting reels on the other side.
Figure 15:
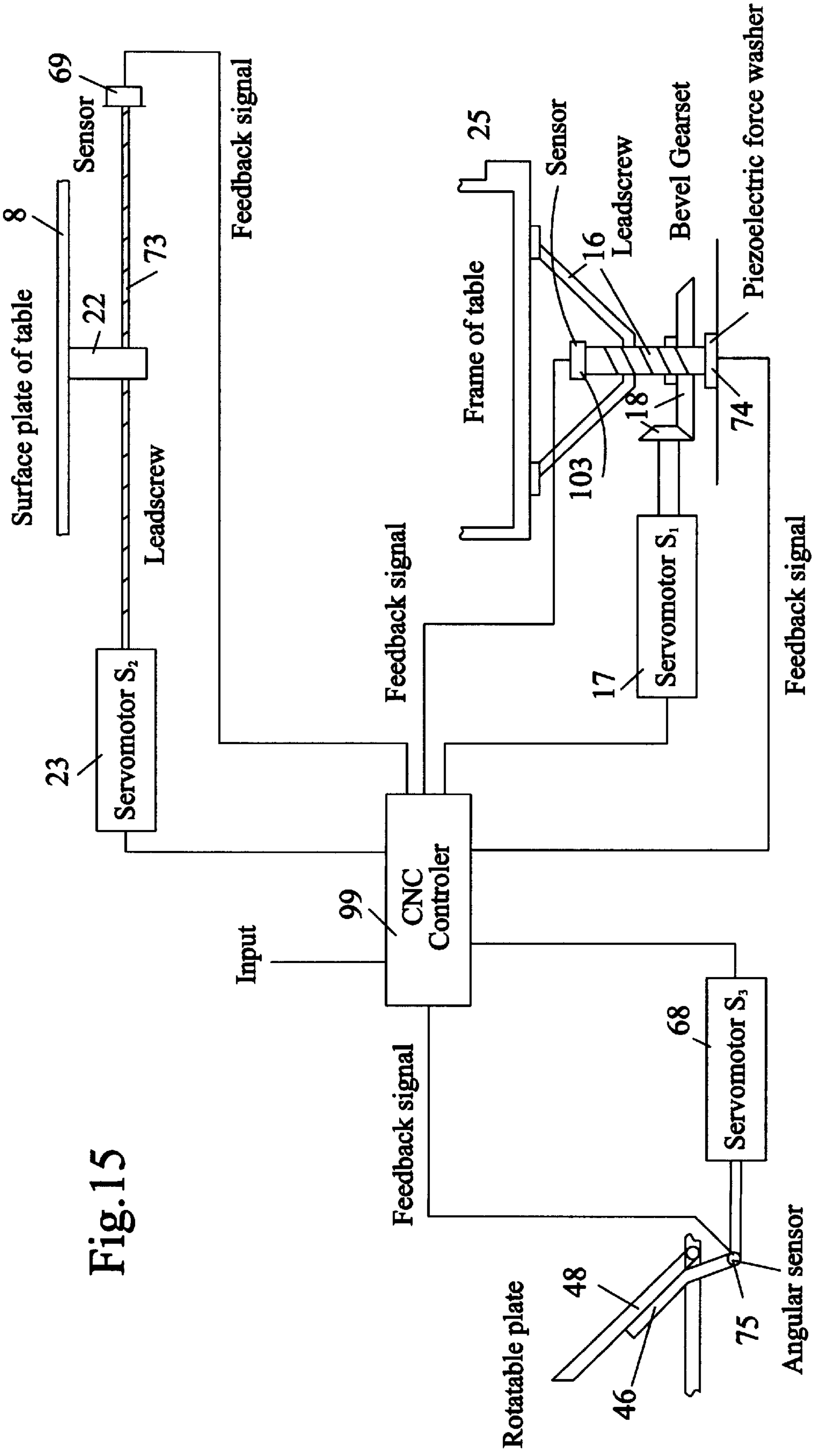
FIG. 15 is a schematic diagram of controlling systems for the movable loading module.

The loading module 53 has capability of multi-direction manipulations to assist both automatic and manual image formation. The graduated platform 3 which at one side has a "V" shape slot 50 engaging on the sliding rail 71 and is supported by the two reels 72 installed in the table-like frame 25 at the other side. as shown in FIG. 2, FIG. 11, FIG. 12, FIG. 13 and FIG. 14, can be transversally reciprocated by the servomotor 23 through the leadscrew 73 and the nut strut 22, and controlled by the CNC controller 99 through a closedloop control system having the positioning sensor 69 attached to one end of the leadscrew 73 to determine positions of the platform on the leadscrew axis. as shown in FIG. 15. And according to different programmed modes, any differences between the input value (position requested) and the measured value (current position) sensed by the sensor 69 will be used to drive the platform toward a zero difference (to position requested), and the control system may be a simple absolute positioning system with a floating zero point at the location where the right side surface of the mark edge 59 is in the plane of the platen 93. The frame 25, engaging on the dovetail sliding rail 24 which is fixed on the main body of the device as shown in FIG. 2, is vertically driven up and down by the servomotor 17 through the bevel gearset 18 and the leadscrew unit 16, and is also under the control of the CNC controller 99 in another closed-loop control system with feedback signals from the positioning sensor 103 which function is similar to that of the positioning sensor 69. The piezoelectric force washer sensor 74 is employed to prevent the said device from damaging by overloads on the frame 25 caused by any unexpected errors. To manipulate and hold the bound originals opened at 90° angle for the dual direction image formation, the rotatable supporting plate 48 is installed on the platform 8 and is driven and controlled by another closed-loop operating system similar to that of the platform 8, which has the servomotor 68, the positive-drive belt(timing belt) 47, the routing shaft 70, the rotatable arms 46 with which the plate 48 is rotated up and down, and the angular sensor 75 which gives feedback signals to the CNC controller 99 to control rotation of the plate 48 within the range between 0° and 90°, as shown in FIG. 12 and 15. There is also installed a sliding graduated plate 9 on the platform 8, as shown in FIG. 11, which is located in the central zone of the platform right beside the mark edge 59 and can be slid in or out in longitudinal direction. Having main registered position marks on its surface where the originals are normally loaded on, the sliding plate 9 is able to provide more flexibility of handling both unbound and bound originals in or out the registered positions. Also on the platform 8 there is the movable positioning bar 52 with the mark edge 59 together to restrain any possible transversal displacement of the loaded originals.

Figure 7:
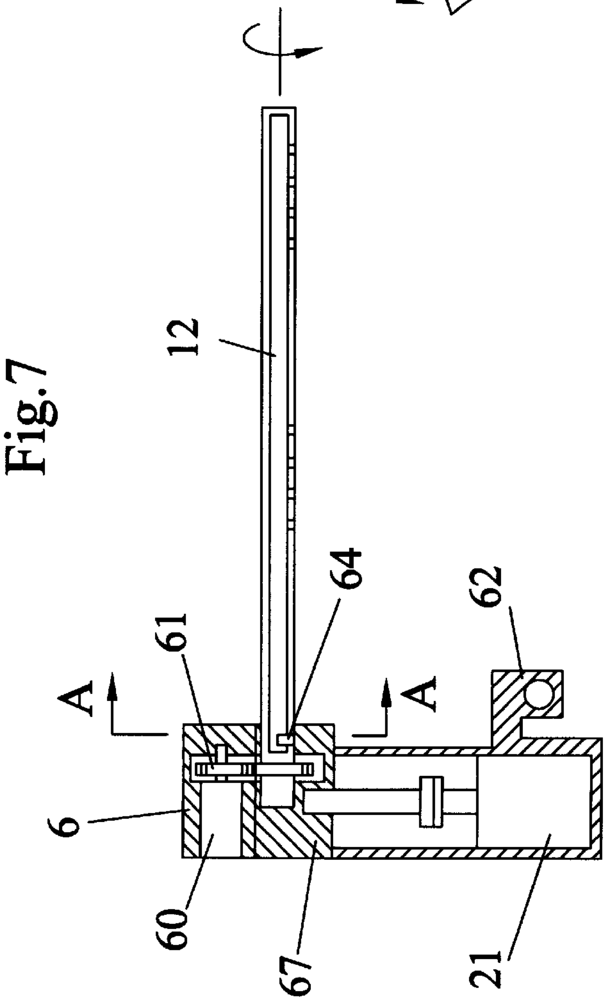
FIG. 7 is a sectional view of the page turner.
Figure 9:
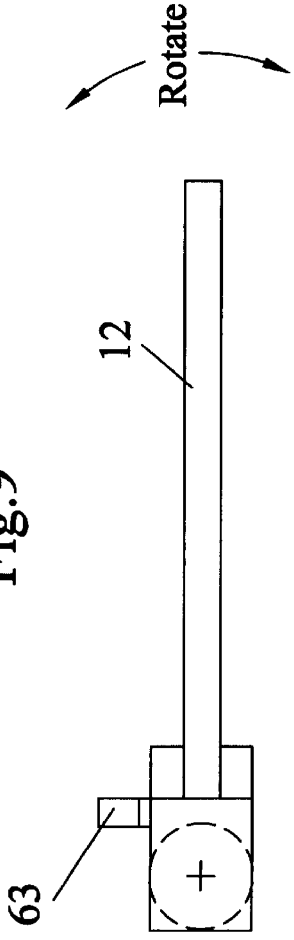
FIG. 9 is a vertical external view of the page turner and the dash line illustrates a rotating direction of the page turner.
Figure 16:
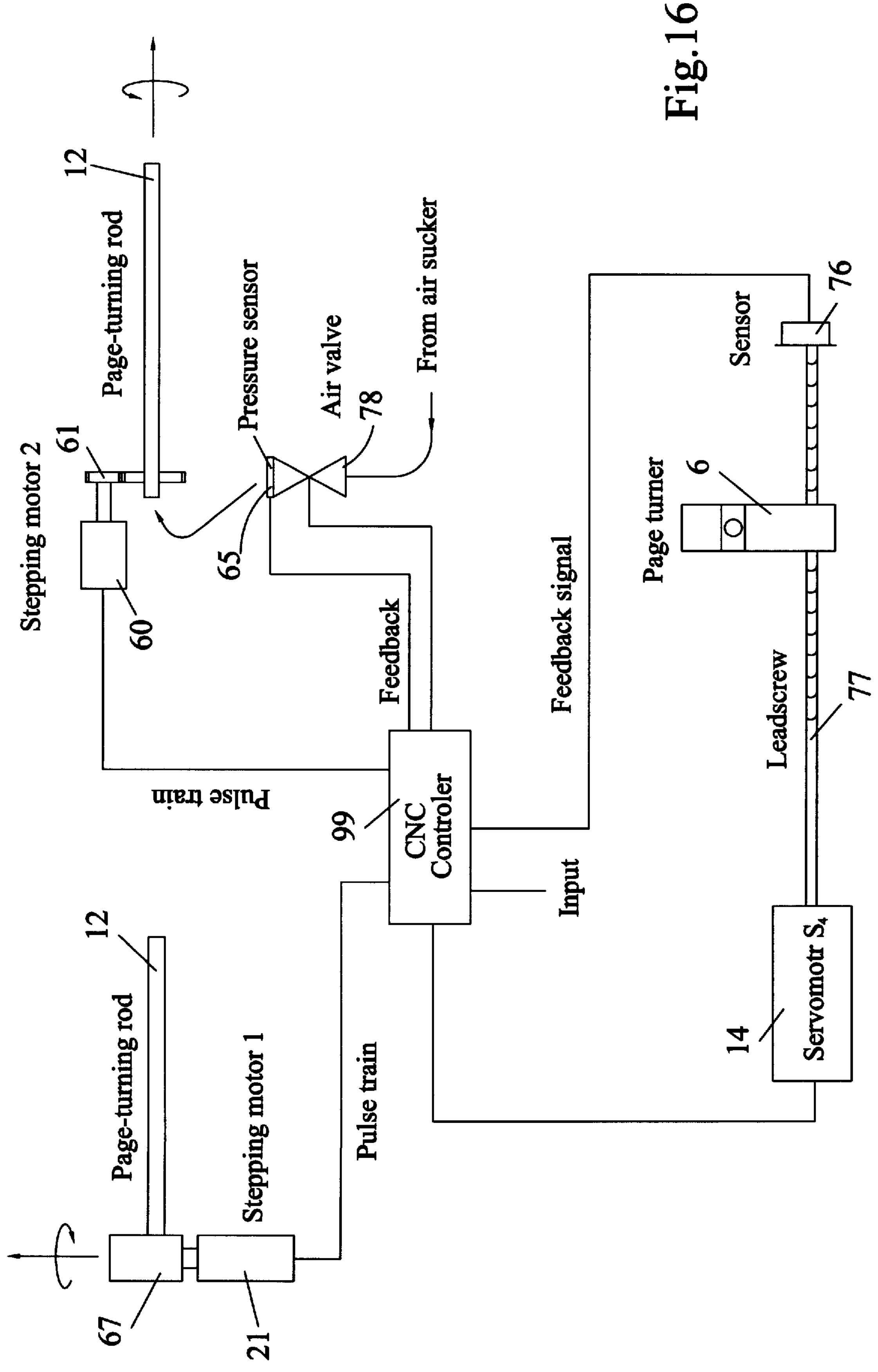
FIG. 16 is a schematic diagram of controlling systems for the page turner.

As shown in FIG. 2, FIG. 7, and FIG. 16. the page turner 6 comprises a moving body constructed with an upper body 67 driven by the stepping motor 21 installed in a lower body which has the nut 62 engaged on the leadscrew 77 driven by the servomotor 14 through the gearset 15, and the page-turning rod 12 installed on the upper body 67, which has a row of small holes at its bottom and Is driven by the stepping motor 60 and the gearset 61 installed in the upper body 67. The page turner 6 has multi-direction mobilities of transversally moving along with the platform 8, 0°–90°–0° rotating the upper body 67 around an axis vertical to the platform 8, and 0°–180°–0° rotating the rod 12 around the axis of itself. With air suction force generated by the air sucker 26 (Using air sucking machine is only one of many alternative methods for different embodiments of the present invention, to provide lifting force of turning pages) through the air valve 78 which may be a plunger-operated valve operated by a cam device that air flows when the plunger is depressed and stops when the plunger is released, the page turner can accomplish the function of lifting up and turning pages the originals. There are four controlling routes applied by the CNC controller 99 to manipulate the turner, as shown in FIG. 16, which are: the first one is a closed-loop control system having the servomotor 14, the leadscrew 77 and the positioning sensor 76 which function is similar to that of the sensor 69 for determining transversal positions of the page turner 6; the second is a close-loop system to control the stepping motor 60 for rotating the rod 12 which rotation is triggered by the positioning of itself and an air pressure dropping feedback signal from the pressure sensor 65 which may be a capacitive diaphragm gage having a pressure range from $\mathbf{10^3}$ to $\mathbf{10^{-4}}$ torr, to collect signals of air pressure changes in the rod 12, whenever the rod 12 lifts up or drops a paper to block or unblock the holes at the bottom of the rod; the last two routes are open-loop control systems for both the stepping motor 21 and the air valve 78.

Figure 6:
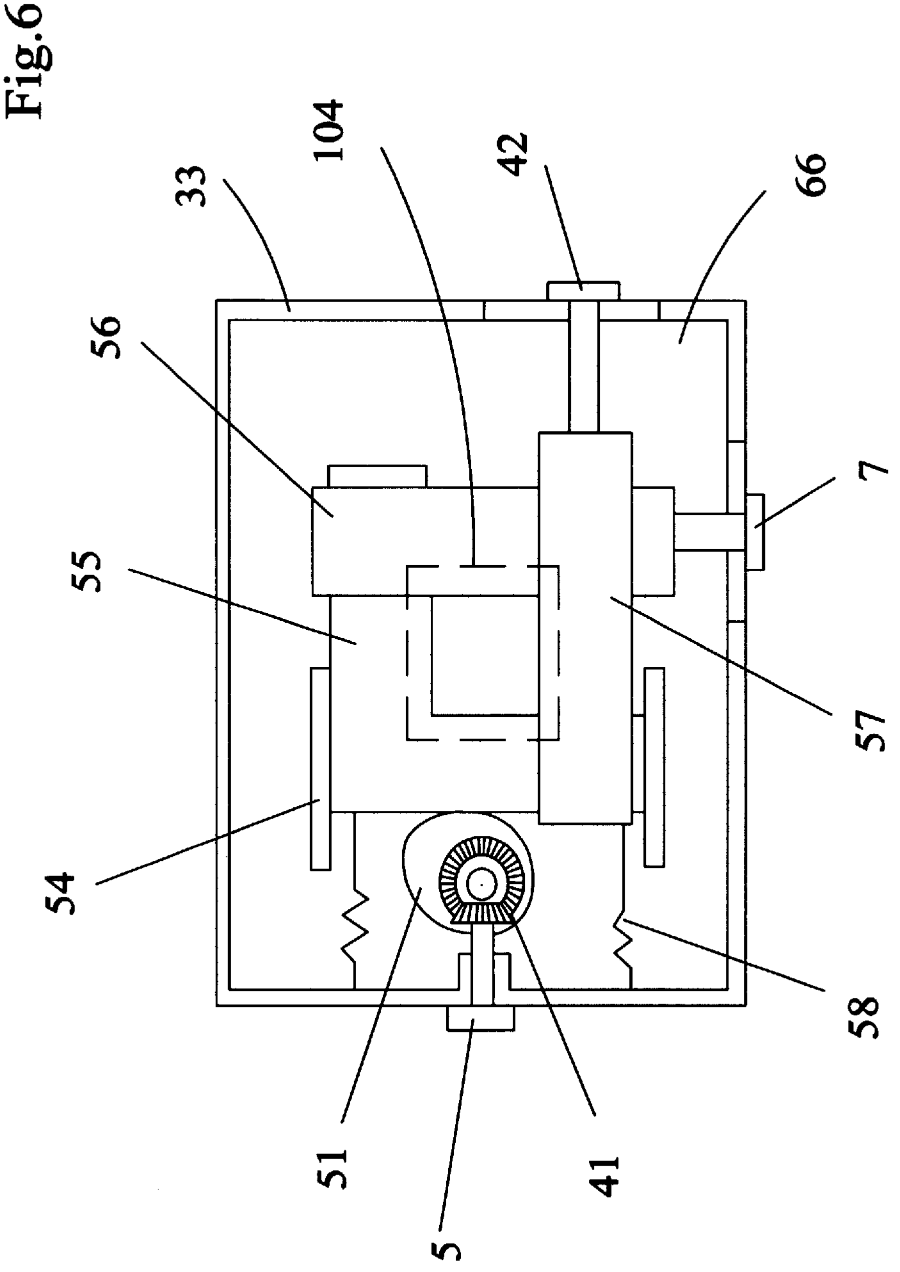
FIG. 6 is a vertical view of a foil shielding unit in the presetting system.
Figure 8:
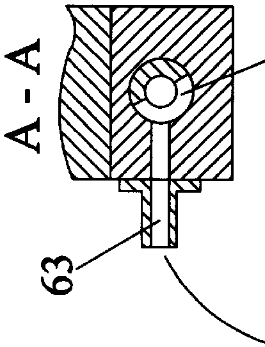
FIG. 8 is an A—A sectional view of the page turner in FIG. 7 illustrating the connection of an air flow between the upper body and page-turning rod of the page turner.
Figure 10:
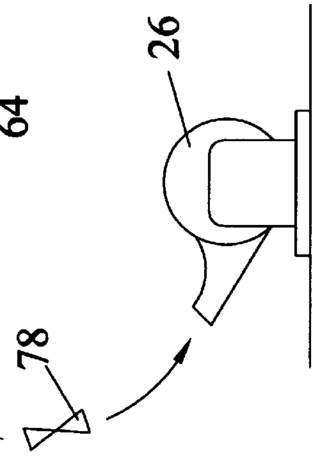
FIG. 10 is a schematic of the air sucking machine.

The presetting system 33, as shown in FIG. 2, FIG. 3 and FIG. 6, comprises the compensating lights 43 installed on the partition 44 on which there is opened a maximum sized image aperture, and the adjustable foil shielding system 34 which is formed with the straight shielding foil 56 manipulated with the knot 7, the straight shielding foil 57 adjusted with the knot 42, and the “L” shape foil 55 adjusted with the knot 5 through the gearset 41, the cam 51 and the springs 58 and guided between a pair of the strips 54 installed on the partition 66 on which there is also a maximum sized image aperture 104 identical with that on the partition 44. Different intensity of reflected image light of the originals and the edges around the originals due to either user's selection or irregularly sized originals. will always produce dark edge effect onto recording media. The presetting system employs the adjustable foil shielding system 34 to cover images of the edges before starting an image recording process, and simultaneously compensates illuminating light of identical intensity onto the upper surfaces of the foils during the process of the image formation. that dark edge shadows can be prevented from forming on the recording media with transferred image, and a wasteful consumption of the toner and a pollution of the transfer charger can also be avoided.

The image monitoring unit 45, as shown in FIG. 2, comprises a projecting housing, the rotatable mirror 19, the reflecting mirrors 31 and 32 orientated in certain angles and the two viewing screens 3 in two different directions. A formed image from the originals can be projected onto one of the screens for assisting users to monitor the set-up of the originals. to select a proper layout and size for the image forming, and to conduct the above mentioned image presetting before starting the image recording process. The mirror 31 may be also rotatable that while it is in the position shown in FIG. 2 the image is projected to the angled viewing screen on the front face of the “z,900” shape assembling module 1, and once it is rotated back to the vertical position, the image is directly projected to the horizontal viewing screen on the top of the module 1. Which one of the screens is to be used is based on the viewing angle selected by users. The mirror 19 may be a rotatable reflecting mirror which has at least two space positions for fully reflecting the image light to the image formation unit and letting the image light bypass to the viewing screens, (As different embodiments of the present invention, the mirror 19 may be a transparent mirror having its bottom surface silvered for splitting the image light of the originals in two different directions).

Figure 18:
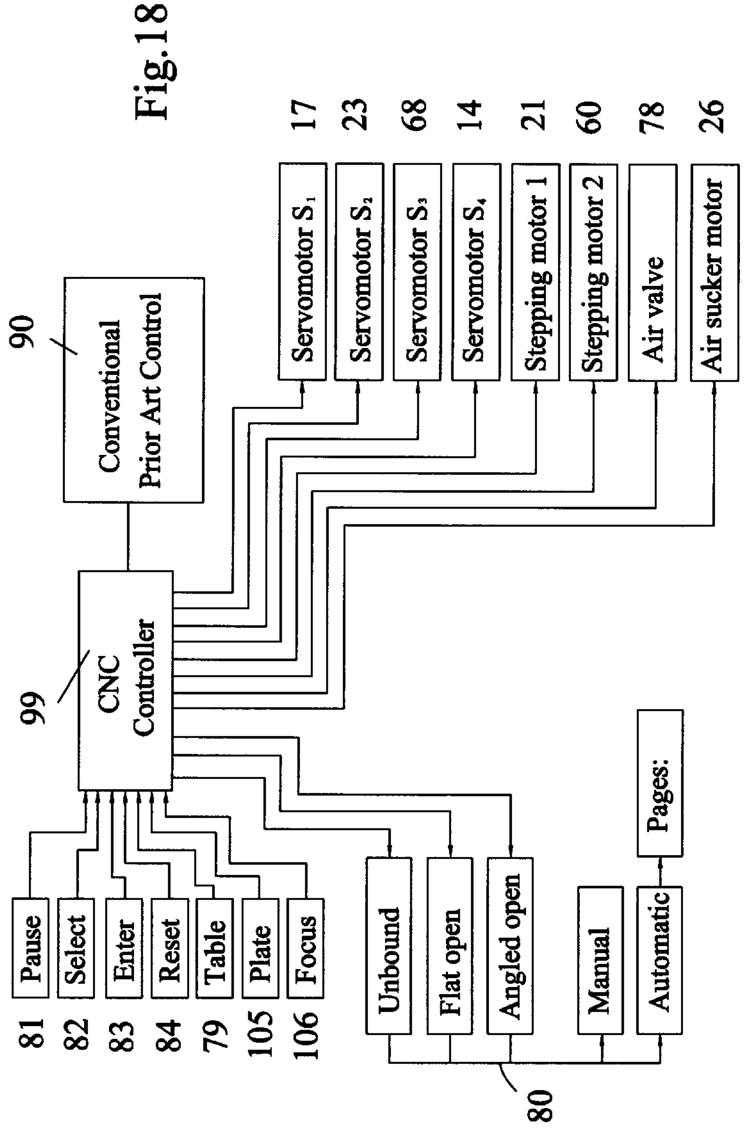
FIG. 18 is a block diagram of operation controls employed in the said device.
Figure 19:
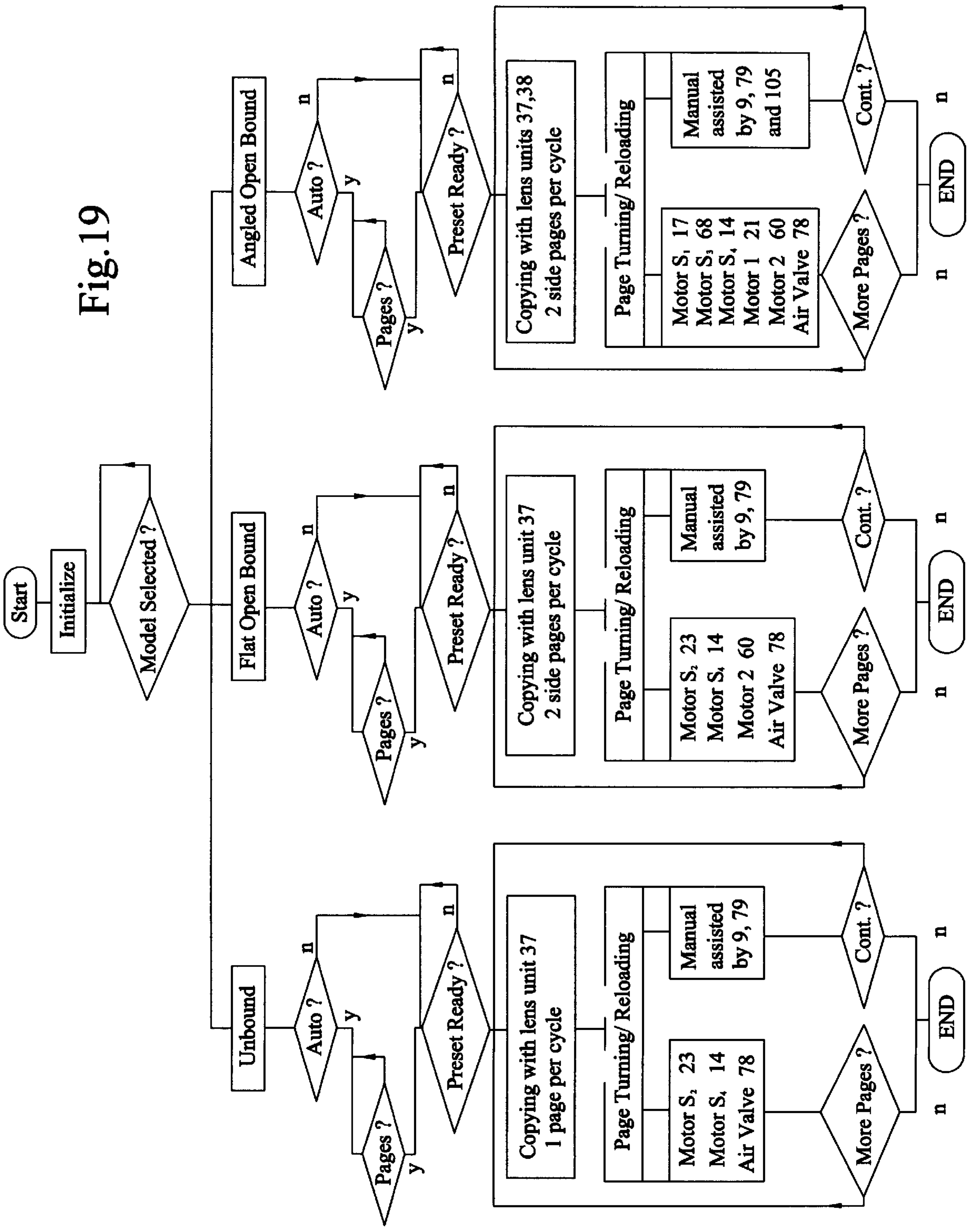
FIG. 19 is a general flow chart illustrating the operating modes and their processes.
Figure 20:
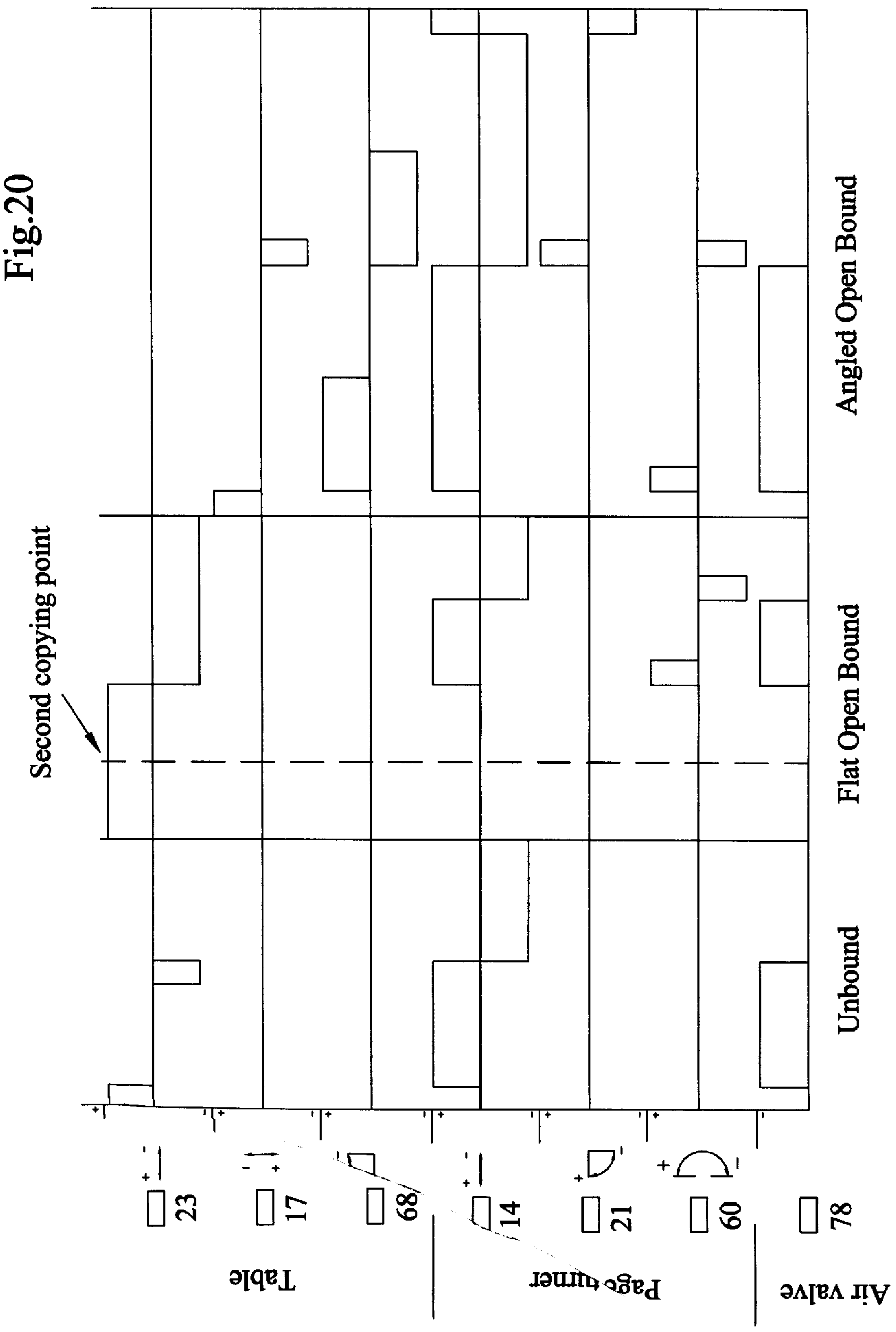
FIG. 20 is schematic timing charts of the three different automatic operating modes.

FIG. 19 is a general flow chart illustrating the major performances of the said device in three main programmed operating modes: Unbound, Flat Open Bound and Angled Open Bound. which can be selected by using the “Select” key 82 and the “Enter” key 83 on the panel 4 in FIG. 17 on which there is a displaying window 80 as an interface of illustrating all related information or instructions to guide users, as shown in FIG. 18. Each one of the operating modes has two kinds of operations: Automatic and Manual. Once the Automatic operation is selected by using the keys 82 and 83, the window 80 will display “Pages: ?”, then the number keys 88 can be applied to input a page range on the window 80 for the originals to be image-recorded. The screen 86 is mainly used for the common functions as in conventional photocopying machine, such as displaying the number of duplications to be made. And this number may be. in this invention, with the input of the selected page range on the window 80 together, also applied to program instructions in the computer for manipulating the closed-loop control systems of the frame 25 and/or the platform 8 to accomplish incremental repositioning of the originals (Feed rate may be about 0.08–0.15 mm per page, or every two or three page a feed at total thickness of the turned pages) while the originals are being turned page by page automatically. The area 89 is for any other conventional operating features and the square 90 represents prior art of conventional control systems for the image formation, both of which may be also, in the present invention, operated by the same microcomputer in 99. FIG. 20 displays schematic timing charts for automatic operations of the three operating modes. On the timing charts, the first column is for Unbound, the second is for Flat Open Bound and the third is for Angled Open Bound. In each one of the columns only one operating cycle is drawn where the left side vertical line represents the current image formation starting point and the right side line is the next image formation starting point. The signs of "+" and "−", and the bars drawn above or below the time axis (horizontal line) illustrate moving directions of related components which are also symbolized on the left side of the charts. The Manual operation is regarded as an image formation operation with interval processes of manual page-turning and repositioning the originals, which provides flexibility for users to carry out any kinds of desired image formation. In order to properly preset the originals into a registered position before starting a process of the image formation, either before selecting an operating mode or after, users can employ the keys 79 to adjust the frame 25 and platform 8 of the loading module 53 and use the key 105 to rotate the plate 48 up or down with reference to the projected image of the originals on the viewing screen 3. After completing an operating mode selection, users have a chance "Preset Ready ?" given by the operating program to reconfirm or redo the presetting of the originals right before starting the process of the image formation, as shown in FIG. 19. At any stage of selecting a mode and related operating parameters, before pushing the key 85 to start an image formation, the "Reset" key 84 can be used to clear all previous selections and let users redo it again. During the process of the image formation the "Pause" key 81 can be used to pause an ongoing process for any purpose, such as readjusting the position of the originals and so on, and if users decide to terminate the image recording process, the "Reset" key 84 can also be employed.

The Unbound mode is for conducting the image formation from any kinds of unbound originals, in which various functions of conventional photocopiers can be easily accomplished. In the Automatic operation of this mode, the originals can be automatically turned page by page and repositioned back to the preset place during a continual operating process which timing chart is illustrated in the first column of FIG. 20. As shown in FIG. 3, after the top page of the originals is image-recorded, the platform 8 carrying the originals moves leftwards a distance $D_1$ to the position $P_0$ where the page-turning rod 12 will suck up the top page, drag it leftwards to the position $P_3$ at distance $D_2$ and release it there, and then move back to $P_0$ while the platform 8 is driven back to the preset position for the next image formation. Apparently, in the above automatic operation of the device, pages of the originals are not conveyed by any mechanical means, so that they will never be jammed. By using the keys 79 and plate 9, the Manual operation of this mode also has the originals all face up positioned on the platform of the said device, having the presetting system 33 to set up an identical image field as desired for the whole process of the image formation, and having the image monitoring unit to real-time monitor the process of the image formation without dark edge effect and conventional face-down guessing on the orientation and field of the originals to be image-recorded. On the other hand, the said device has little volume limit for loading originals, as long as the originals can be loaded in the space between the platform 8 at its lowest position and the bottom platen 92 of the said device.

The Flat Open Bound mode is for the image formation from the bound originals which can be flat opened with little distortion of opened pages and some bound originals which may be oversized by comparison with the size of the platen 93, but still within the adjustable range of the lens unit 37. In this mode, the presetting system 33 provides another advantage of setting up a properly sized identical image field for both side pages of the originals without dark edge effect and interference of two adjacent pages. In the Automatic operation of this mode, the flat face-up opened originals can be automatically left-right reciprocated to feed in turn its left and right side pages into a registered position under the platen 92 corresponding to the lens unit 37, and be also automatically turned page by page during a continual operating process which timing chart is illustrated in the second column of FIG. 20. It is shown in the second column of FIG. 20 that there is a second image formation point on the half way of moving the platform leftward at distance $D_0$ for the image formation from the second (right side) opened page of the originals. as shown in FIG. *3a*. In this mode, the platform control system has a zero point established at the intersecting point (in a view of one dimension) between the plane of the surface of the platen 93 and the plane of the surface of the platform 8 with the mark edge 59 as a reference point. When bound originals are loaded on the platform 8, the binding line of the originals can be positioned corresponding to the reference mark edge 59 and the left edge of the opened originals is preset at the plane of the platen 93 where the origin of the coordinates for motion of the platform 8 is located, and therefore after the left side page of the originals is image-recorded. the closed-loop control system of the platform 8 has no difficulty to move the edge 59 into the position at the plane of the platen 93 by sensing the distance $D_0$ from the edge 59 to the origin in the plane no matter what size of the originals is, for the second image formation from the right side page of the originals. After two sides of the originals are all image recorded, the platform 8 will move left again the same distance $D_0$ to carry the right edge of the opened originals to the position $P_0$ where the page turner will suck up the top page, counter-clockwise rotate 180° to roll up the page on the rod 12, drag it to the position $P_3$ at distance $D_2$ and release it there, then move back to the position $P_0$ while the platform 8 carrying the originals moves all the way back to the preset position for the next cycle of the image formation. The Manual operation of this mode is similar as in the Unbound mode that the originals only need to be face-up opened and properly positioned on the platform 8, and then based on the view of the originals on the screen 3, the key 79 can be used to reciprocate both sides of the originals in turn into a the registered position corresponding to the lens unit 37 for the image formation.

Bound originals having heavy distortion of opened pages in an opening position due to nature of binding tension, can be automatically or manually handled for the image formation by using the Angled Open Bound mode in which the originals can be face-up opened at 90° angle with its right side page lying horizontally close-up to the bottom platen 92 and the left side page close-up to the side platen 93, so that most page distortion can be prevented in a way of only "half" opening the originals. And the two lens units in the image forming housing 101 can be used in turn to accomplish the dual direction image formation, with the lens unit 38 for the left side of the originals and the lens unit 37 for the right side, as shown in FIG. 5. Accordingly the image recording unit 2 will be run twice for each set-up of the originals. In the Automatic operation of this mode, the originals can be preset in a position as shown in FIG. 5, by using the key 79 and the key 105, and the starting position of the page turner 6 is at the position $P_1$. After the image formation from the current two side pages of the originals is completed, the table-like frame 25 is lowered a distance of $d_1$, so that the page turner is able to scan through the gap between the platen 92 and the top page of the originals 11. Once the page turner with lifting force is driven to the position $P_2$, the right side top page of the originals will be lifted up to block the air holes at the bottom of the page-turning rod 12 of the palm turner 6, so that the pressure change signal will be immediately sent back to the micro-computer in 99 by the pressure sensor 65 and the CNC controller 99 will instruct the stepping motor 60 to rotate the rod 12 for rolling up the right side top page, meanwhile the page turner continues moving leftwards and the plate 48 moves down to the 0° position, as shown in FIG. 4. As soon as the page turner 6 reaches the position $P_3$, the rod will release the lifted-up page and rotate back to the previous position with the holes at the bottom, and the table-like frame 25 and the rotating plate 48 start to move the originals back to the preset position and the stepping motor 21 will simultaneously rotate the upper body 67 of the page turner 6 clockwise 90° to allow the page turner moving back to the position $P_1$ without interference with the rotating plate 48 or the loaded originals, and then after the page turner arrives at the position $P_1$the motor 21 will rotate the rod 12 counter-clockwise 90° to the preset position for the next image formation. The third column of FIG. 20 is a schematic timing chart of the automatic operation of the Angled Open Bound mode. In the Manual operation of this mode, the originals can be also positioned as in the Automatic operation or removed from the position by using the operating key 79 and 105, and the rest operation is similar as in the Manual operation of Flat Open Bound mode.

What is claimed is:

1. An image forming device for both automatic and manual image formation from both unbound and bound originals thereof, comprising:

image forming means for forming images of the said originals;

image recording means for recording the formed images of the said originals onto recording media;

means, having open and closed positions, for shutting off the image light to an image bearing member in the said image recording means;

means for presetting an image field in a desired size, eliminating any dark edge effect in the formed images of the said originals, preventing dark edge shadows from forming on the recording media with transferred images and avoiding a wasteful consumption of toner and a pollution in the said recording means;

means for monitoring the set-up of the said originals in different sizes so that the orientation, field and size of the images of the said originals can be visibly adjusted before starting an image recording process;

means for loading, positioning and manipulating the said originals;

means for turning pages of the said originals; and controlling means, having a microcomputer-based controlling unit, for programming and instructing the said device to perform the said image formation.

2. The image forming device as in claim 1, wherein the said image forming means comprises an image forming housing with working platens which are constructed to form the images of the said originals from the top of the said originals, a flexible lens system which lens units can be constructed with a group of either positive lenses or negative lenses, or with combinations of both positive and negative lenses, a set of beam splitting mirrors and a set of reflecting mirrors for guiding the reflected image light from the said originals, and a group of lamps for illuminating the said originals.

3. The image forming device as in claim 2, wherein the said image forming means comprises the lens system which can have zooming function and adjustable focusing to enhance the capabilities of forming enlarged or reduced images from the said originals and selecting a desired portion of the image of a page of the said originals by stepless magnification or reduction.

4. The image forming device as in claim 1, wherein the said image recording means can be constructed with either a photoreceptor belt image formation system or a photosensitive drum scanning image formation system or any other kinds of optical image recording systems for accomplishing the said image formation.

5. The image forming device as in claim 1, wherein the said shutter means comprises a shutter for shielding the image light, a manipulating mechanism for opening and closing the shutter and a shutter solenoid for operating the said mechanism..

6. The image forming device as in claim 1, wherein the said presetting means comprises a group of preset image apertures, a set of compensating lights and an adjustable foil shielding system built with a manipulating mechanism, which can be used to set up an image field in a desired size within the said apertures and eliminate any dark edge effect by covering dark images of the edges around the said originals and providing compensating light onto the shielding foils during the said image recording process.

7. The image forming device as in claim 1, wherein the said monitoring means comprises a projecting housing, a set of beam splitting mirrors, a set of orientated reflecting mirrors and a graduated image viewing screen onto which the images of the said originals can be projected for the purpose of monitoring the set-up of the said originals in different sizes and adjusting the orientation, field and size of the images of the said originals before starting the said image recording process.

8. The image forming device as in claim 1, wherein the said loading means, having capabilities of multi-direction manipulations, comprises a movable table-like frame, a movable graduated platform installed on the said frame and a movable graduated flat sliding plate on the said platform, to accomplish any motion in three dimension space for positioning and manipulating the said originals.

9. The image forming device as in claim 8, wherein the said loading means can be used to position the said originals at different distances from the said platens of the said image forming means to add more capabilities of forming enlarged or reduced images from the said originals by stepless magnification or reduction.

10. The image forming device as in claim 1, wherein the said page turning means comprises a movable page turning rod having lifting force to lift and turn pages of the said originals and a movable manipulating mechanism carrying the said rod and having multi-direction mobilities to operate the said rod.

11. The image forming device as in claim 1, wherein the said controlling means instructs the said image forming means, the said loading means, the said page turning means, the image recording means and the said shutter means for focusing, positioning the said originals, turning paces of the said originals and conducting the said image formation.

12. An image forming device for conducting both automatic and manual image formation in different operating modes which can be Unbound Mode for face-up positioned unbound originals, Flat Open Bound Mode for 180° flat face-up open-positioned bound originals and Angled Open Bound Mode for less than 180° angled face-up open-positioned bound originals thereof, comprising:

image forming means having dual direction image forming flexibility, for forming images of the said originals;

image recording means for recording the formed images of the said originals onto recording media;

means, having open and closed positions, for shutting off the image light to an image bearing member in the said image recording means;

means for presetting an image field in a desired size, eliminating any dark edge effect in the formed images of the said originals, preventing dark edge shadows from forming on the recording media with transferred images and avoiding a wasteful consumption of toner and a pollution in the said recording means;

means for monitoring the set-up of the said originals in different sizes so that the orientation, field and size of the images of the said originals can be visibly adjusted before starting an image recording process;

means for loading, positioning and manipulating the said originals;

means for turning pages of the said originals; and controlling means, having a microcomputer-based controlling unit, for programming and instructing the said device to perform the said image formation in the said different operating modes.

13. The image forming device as in claim 12, wherein the said image forming means comprises an image forming housing with a side platen constructed at a certain angle and a bottom platen facing down, a flexible dual direction lens system having two lens units one of which is vertically face-down towards the said bottom platen and the other is towards the said side platen of the said housing, a set of beam splitting mirrors and a set of reflecting mirrors arranged in dual angled optical routes for guiding the reflected image light from the said originals to the said monitoring means and the said image recording means, and two groups of illuminating lamps in two divided working cells corresponding to the said two platens for illuminating the said originals, for either single or dual direction image forming from the said originals.

14. The image forming device as in claim 13, wherein the said image forming means comprises the lens system which can have zooming functions and adjustable focusing to enhance the capabilities of forming enlarged or reduced images from the said originals and selecting a desired portion of the image of a page of the said originals by stepless magnification or reduction.

15. The image forming device as in claim 12, wherein the said image recording means can be constructed with either a photoreceptor belt image formation system or a photosensitive drum scanning image formation system or any other kinds of optical image recording systems for accomplishing the said image formation.

16. The image forming device as in claim 12, wherein the said shutter means comprises a shutter for shielding the image light, a manipulating mechanism for opening and closing the shutter and a shutter solenoid for operating the said mechanism.

17. The image forming device as in claim 12, wherein the said presetting means comprises a group of fixed image apertures, a set of compensating lights and an adjustable foils shielding system built with a manipulating mechanism, which can be used to preset an image field in a desired size within the said apertures and eliminate any dark edge effect by covering dark images of the edges around the said originals and providing compensating light onto the shielding foils during the said image recording process.

18. The image forming device as in claim 12, wherein the said monitoring means comprises a projecting housing, a set of beam splitting mirrors, a set of orientated reflecting mirrors and two graduated image viewing screens towards two different directions onto either one of which the image light of the said originals can be projected for the purpose of monitoring the set-up of the said originals in different sizes and adjusting the orientation, field and size of the images of the said originals before starting the said image recording process.

19. The image forming device as in claim 12, wherein the said loading means, having capabilities of multi-direction manipulations, comprises a movable table-like frame, a movable graduated platform installed on the said frame, a movable supporting mechanism installed on the said platform to hold the bound originals opened at an angle of less than 180° for the dual direction image forming, and a movable graduated flat sliding plate on the said platform, to accomplish any motion in three dimension space for positioning and manipulating the said originals.

20. The image forming device as in claim 19, wherein the said loading means can be used to position the said originals at different distances from the said bottom platen of the said image forming means to add more capabilities of forming enlarged or reduced images from the said originals by stepless magnification or reduction.

21. The image forming device as in claim 12. wherein the said page turning means, being able to be manipulated an a continual process of the said image formation, comprises a movable page turning rod having lifting force to lift and turn pages of the said originals, and a movable mechanism carrying the said rod and having multi-direction mobilities to manipulate the said rod.

22. The image forming device as in claim 12, wherein the said controlling means instructs the said image forming means, the said loading means, the said page turning means, the image recording means and the said shutter means according to the said operating modes for focusing, positioning the said originals, turning pages of the said originals and conducting the said image formation.

* * * * *